United States Patent [19]

Kohler et al.

[11] Patent Number: 4,477,531
[45] Date of Patent: Oct. 16, 1984

[54] MAGNETIC STORAGE MEDIUM

[75] Inventors: Robert Kohler, Wessling; Burkhard Nippe, Munich; Heinrich Kober, Hohenschaeftlarn; Karlchristian Schilffarth, Sauerlach; Walter Meckel, Neuss; Bernd Quiring, Leverkusen, all of Fed. Rep. of Germany

[73] Assignee: Agfa-Gevaert AG, Leverkusen, Fed. Rep. of Germany

[21] Appl. No.: 396,238

[22] Filed: Jul. 8, 1982

[30] Foreign Application Priority Data

Jul. 15, 1981 [DE] Fed. Rep. of Germany ....... 3127884

[51] Int. Cl.³ .......................... G11B 5/68; B32B 27/40
[52] U.S. Cl. ............................... 428/425.9; 252/62.54; 360/134; 360/135; 360/136; 428/522; 428/524; 428/694; 428/900; 427/128
[58] Field of Search ...................... 428/425.9, 694, 900, 428/522; 252/62.54; 427/128; 360/134–136

[56] References Cited

U.S. PATENT DOCUMENTS

| 3,149,995 | 9/1964 | Bauer | 428/900 |
| 3,650,828 | 3/1972 | Higashi | 428/425.9 |
| 3,922,439 | 11/1975 | Hartmann | 428/900 |
| 3,929,659 | 12/1975 | Graham | 252/62.54 |
| 4,018,967 | 4/1977 | Roller | 428/900 |
| 4,058,646 | 11/1977 | Vaeth | 428/425.9 |
| 4,320,171 | 3/1982 | Motz | 428/425.9 |
| 4,328,282 | 5/1982 | Lehner | 428/425.9 |

FOREIGN PATENT DOCUMENTS 723666 3/1980 Japan .

Primary Examiner—Ellis P. Robinson
Attorney, Agent, or Firm—Connolly and Hutz

[57] ABSTRACT

The present invention relates to a magnetic storage medium consisting of a non-magnetic layer support and, applied thereto, a binder-containing magnetic layer, the binder consisting of from 25 to 100% of a thermoplastic polyurethane substantially free from reactive terminal groups obtained by reacting a linear polyester of at least one dicarboxylic acid containing from 2 to 8 carbon atoms and/or hydroxy carboxylic acid containing from 4 to 6 carbon atoms and at least one glycol containing from 2 to 6 carbon atoms, the polyester having a molecular weight of from 1200 to 6000, at least one diisocyanate and a mixture of at least two glycols containing from 2 to 20 carbon atoms, the molar fraction of the individual components not exceeding 0.8. The polyurethane has a hardness of from 80 to 100 Shore A, a tensile strength of from 30 to 75 MPa and a breaking elongation of from 320 to 520%.

9 Claims, No Drawings

MAGNETIC STORAGE MEDIUM

This invention relates to a magnetic storage medium confirming a non-magnetic layer support and, built up thereon, a magnetic layer containing a least one polyurethane as binder.

The efforts which are currently being made to improve magnetic recording media are particularly directed to increasing the storage density. The magnetic materials required for this purpose, with the high saturation magnetisation and high remanent magnetisation thereof, contain, for example, Co-doped iron oxides, magnetides or metal powders. It is particulary important to pack the magnetic pigment in the recording layers as densely as possible. Ideally, the recording layer should consist entirely of magnetic material. Although efforts to produce storage media of the type in question, for example by vapour deposition or plating, have been partially successful, most of the storage layers produced at present still contain particulate magnetic pigments in a binder matrix. The aim is to obtain increased packing density by reducing the amount of binder and an improved signal-to noise ratio by using increasingly finer pigments characterised by pronounced acicularity. In both cases, however, the mechanical stability of the layers is becoming more critical.

The properties required for practical application, above all abrasion resistance and good running properties may only be achieved by using binders or binder combinations having excellent mechanical behaviour. It is essential that, even with high pigment concentrations, the binders should still exert strong adhesive forces on the surface of the pigment particles.

It is known that magnetic layers subjected to severe mechanical stressing advantageously contain polyurethane elastomers as binder. Polyester urethanes of the type described in DE-AS No. 1,106,959 and polyether urethanes of the type described in U.S. Pat. No. 2,899,411 have proved to be particulary effective. Unfortunately, such polyurethanes, as sole binder, are often attended by disadvantages. In many cases, wetting and dispersion of the pigment particles are adversely affected thus dispersion of possible sinterings forthcoming from the grinding stage is inadequate or agglomeration of the pigment particles is not sufficiently prevented, leading to reduced packing densities and hence to poorer orientability. Another disadvantage of the above-mentioned polyurethanes resides in the fact that, in many cases, the necessary elasticity is accompanied by inadequate hardness and a tendency towards surface tackiness. For this reason, polyurethanes of the type in question have already been combined with other binders. DE-AS No. 1,269,661, for example, describes a mixture of polyurethanes with polyesters. In practice, however, the disadvantages referred to above are not sufficiently avoided. Other proposed binder combinations are, for example, mixtures of polyurethanes with phenoxy resins (DE-AS No. 1,295,011), with vinylidene chloride/acrylonitrile copolymers (DE-AS No. 2,037,605) or with polycarbonates (DE-OS No. 2,114,611). Combinations of polyurethane resins with vinyl chloride/vinyl acetate copolymers, as described in DE-AS No. 1,282,700, or combinations of polyurethane elastomers with copolymers of vinyl chloride and acrylic acid esters, as described, for example, in DE-OS Nos. 2,255,802 or 2,234,822, show good pigment dispersibility and give layers characterised by a high packing density. However, with finely particulate pigments, such as magnetites or iron powders, these layers do not have the necessary abrasion resistance.

It has now been found that, in many cases, the described binder combinations, some of which have already been successfully used, no longer satisfy the increasing quality requirements which the layer properties are having to meet in cases where very finely particulate and/or relatively soft pigments, such as highly acicular iron oxides, magnetites or metallic iron or metal alloys, are used, resulting in mechanical difficulties and, more particularly, in increased abrasion.

Accordingly, an object of the present invention is to provide magnetic storage media confirming non-magnetic layer supports and magnetic coatings which, even with finely particulate and/or mechanically-sensitive pigments, show high pigment packing densities and superior mechanical properties.

According to the present invention, this object is achieved in that the binders used are certain polyester urethanes, more particularly from 25 to 100% of thermoplastic polyurethanes substantially free from reactive terminal groups obtained by reacting:

(a) a linear polyester of at least one dicarboxylic acid containing from 2 to 8 carbon atoms and/or hydroxy carboxylic acid containing from 4 to 6 carbon atoms and at least one glycol containing from 2 to 12 carbon atoms and having a molecular weight of from 1200 to 6000, with (b) at least one diisocyanate, and (c) a mixture of at least two glycols containing from 2 to 20 carbon atoms, the molar fraction of the individual components not exceeding 0.8.

Not only has it been found that surprisingly favourable mechanical properties in regard to abrasion resistance and minimal blocking during winding and rewinding are obtained, another unexpectedly favourable effect observed is that the described polyurethanes have very good dispersion properties for pigments. Accordingly, it is possible to obtain higher pigment packing densities. In addition, the favourable dispersion properties thereof even enable the polyurethanes and according to the present invention to be used as sole binder so that the range of possible combinations is considerably broadened for obtaining the required layer properties.

Although the connections between the mechanical properties of the pure binders and the resulting properties of the magnetic layers have not yet been explained in detail, it may be assumed that the favourable properties of the polyurethanes are attributable to the combination of relatively good hardness and high elasticity and, at the same time, very high pigment binding power.

The polyurethanes may be produced by known processes, some of them being described in DE-OS No. 2,402,799. Suitable linear polyesters having a molecular weight of from 1200 to 6000 are reaction products of aliphatic dicarboxylic acids, such as succinic acid, glutaric acid, adipic acid, azelaic acid, pimelic acid and suberic acid, and aromatic dicarboxylic acids, such as terephthalic acid, isophthalic acid, phthalic acid and mixtures of these acids, and/or hydroxy carboxylic acids, such as ε-hydroxy-caproic acid, but above all adipic acid, with dihydric alcohols, such as ethylene glycol, 1,2- and 1,3-propylene glycol, 1,4- and 2,3-butylene glycol, neopentyl glycol, 1,6-hexane diol, 1,4-dimethylol cyclohexane, trimethyl-1,6-hexane diol and 1,12-dodecane diol. Starting components suitable for use in the production of the polyurethanes are diisocyanates, such as 1,6-hexamethylene diisocyanate, 4,4'-diphenyl methane diisocyanate, tolylene diisocyanate, xylylene diisocyanate and and 4,4'-diisocyanato-dicyclohexyl methane. The low molecular weight diol components used as chain-extenders are glycols, such as ethylene glycol, 1,2- and 1,3-propylene glycol, 1,4-butane diol, 1,5pentane diol, neopentyl glycol, 1,6-hexane diol, 1,4-dimethylol cyclohexane, trimethyl-1,6-hexane diol, 1,12-dodecane diol, bis-(2-hydroxyethyl-esters) of hydroquinone, bisphenol A or hydrogenated bisphenol A. A mixture of the above-mentioned diols in a molar ratio of from 20:80 to 80:20, more particularly a mixture of ethylene glycol and 1,4-butane diol, may be used for chain-extension. The polyurethanes used in accordance with the present invention are substantially free from reactive terminal groups and are generally produced using an NCO/OH-ratio of from 0.95 to 1.05, preferably from 0.97 to 1.01. Suitable polyurethanes have a Shore A hardness of from 80 to 100, a tensile strength of from 30 to 75 MPa and a breaking elongation of more than 300%, more particularly from 320 to 520%.

Although in principle the polyurethanes and according to the present invention may be used as sole binder and give magnetic layers having a high packing density and very high mechanical stability, the present invention is by no means limited to the use of polyurethanes alone. Thus, it may be advantageous for optimising the various parameters to combine the polyurethanes with other binders. The layer properties may, of course, also be optimised by other of the available options, for example by the addition of additives, such as lubricants, plasticisers and abrasives and optionally cross-linking the layers with isocyanates or melamine resins.

The magnetic layers are produced in known manner by dispersing the magnetic material in solutions of the polyurethane binders, optionally containing additives, and applying a layer of the resulting dispersion to a non-magnetic layer support.

Suitable solvents are the liquids normally used for dissolving polyurethanes providing the dissolving power thereof is adequate. Examples include dimethyl formamide, dioxane, tetrahydrofuran and cyclohexane, optionally in combination with one another or with other solvents, such as methyl ethyl ketone, toluene and methyl isobutyl ketone.

As the magnetisable material ferromagnetic substance being suitable for storage purposes can be employed. Examples are γ-iron oxides, magnetites, mixed phases of magnetite and γ-iron oxides, Co-doped iron oxides, ferrites, CrO$_2$, metallic pigments, such as pure iron or ferromagnetic metal alloys.

Dispersion aids will generally be used for producing the magnetic dispersion. In every case, the dispersion aid used should be adapted to the pigment, the solvent and the remaining constituents of the formulation and to the properties of the final layer. The dispersion aid will be selected from the range of known surface-active compounds, such as lecithin, cephalin, fatty acid amines or diamines and the ammonium salts thereof, ethoxylated fatty acid derivatives, aliphatic or aromatic, optionally ethoxylated phosphoric acid esters, sulphosuccinic acid esters, sorbitan esters, aliphatic or aromatic sulphonic acids or sulphonates, and fatty alcohol sulphates.

In order to obtain particular layer properties, the polyurethane binders used in accordance with the present invention may also be used in combination with other polymers or resins, such as polyvinyl chloride, vinyl chloride/vinyl acetate copolymers, polyvinylidene chloride, copolymers of vinyl chloride with acrylates or methacrylates, polyvinyl acetals, such as polyvinyl formal or polyvinyl butyral, polyacrylates, epoxide resins and polyesters.

Cross-linking of the magnetic layers with reactive compounds may be particularly important in some cases. Aliphatic or aromatic, polyfunctional isocyanates or even malamine resins are preferably used for this purpose.

Other constituents may be used in the formulation, depending on the required properties of the dispersion or the final layer. The constituents in question are, in particular, lubricants, such as fatty acids, or fatty acid derivatives, silicone oils, paraffins, waxes, fluorinated oils and dispersions of polytetrafluoroethylene. Other possible additives are, for example, plasticisers, abrasives and viscosity regulators.

The coating dispersion may be prepared in known manner by mixing the magnetic material with a suitable solvent using, for example, a kneader, stirrer or dissolver unit. The solvent may contain all or only part of the dissolved binder and also dispersants and other additives. The pre-mixed dispersion is normally subjected to grinding until the magnetic pigment has been adequately dispersed. Grinding is carried out, for example, in ball mills, bead mills or sand mills. Binder residues or additives are optionally added on completion of the grinding process. The non-magnetic layer support is subsequently coated with the magnetic dispersion in known manner, for example, by reserve-roll coating, screen printing or extrusion coating. Suitable layer supports are films of polyesters, such as polyethylene terephthalate, polyolefins, such as polypropylene, cellulose derivatives, such as cellulose triacetate, polycarbonates, or rigid layer supports of nonmagnetic metals, such as Al, or ceramic materials. The further processing of the coated materials, such as surface smoothing by calendering, cutting and making up, may be carried out in known manner.

The present invention is illustrated by the following Examples.

EXAMPLE 1

To produce the magnetic coating dispersion, a mixture is prepared from the following components:

| | |
|---|---|
| Magnetite having a BET-surface of 26 m$^2$/g | 80 parts, by weight, |
| Dodecyl benzene sulphonic acid | 2.5 parts, by weight, |
| ethoxylated phosphoric acid esters | 4.0 parts, by weight, |
| Polyester urethane of a co-polyester of ethylene glycol/1,4-butane diol having a molecular weight of 2000, 1,4-butane diol and 1,6-hexane diol (molar ratio 1:1) and 4,4'-diphenyl methane diisocyanate | 14.7 parts, by weight, |
| Technical stearic acid | 0.4 part, by weight, |
| Tetrahydrofuran | 135.0 parts, by weight, |
| Cyclohexanone | 50.0 parts, by weight, |

The mixture is pre-dispersed in a dispenser and then ground for 3.5 hours in a stirrer-equipped ball mill. After filtration, the coating lacquer is applied in a layer thickness of 5 μm to a 12 μm thick polyester film, followed by calendering. 3.81 mm wide tapes are cut from the material and made up into compact cassettes.

COMPARISON EXAMPLE A

The magnetic tape coating is prepared in the same way as described in Example 1, except that the polyurethane used in accordance with the present invention is replaced by a polyester polyurethane prepared from adipine acid, butane diol, diphenyl diisocyanate according to DE-AS No. 1,106,959.

COMPARISON EXAMPLE B

A magnetic coating dispersion is prepared in the same way as described in Example 1, except that the polyurethane used in accordance with the present invention is replaced by a polyether polyurethane according to U.S. Pat. No. 2,899,411 (sold unter the trademark Estane 5714 by Goodrich).

EXAMPLE 2

A magnetic coating dispersion is prepared from

| | |
|---|---|
| Magnetite | 80.0 parts, by weight, |
| Lecithin | 3.5 parts, by weight, |
| A polyester urethane of a copolyester of ethylene glycol/1,4-butane diol having a molecular weight of 2000, 1,4-butane diol and 1,6-hexane diol (molar ratio 70:30) and 4,4'-diphenyl methane diisocyanate | 14.7 parts, by weight, |
| Technical stearic acid | 0.4 part , by weight, |
| Tetrahydrofuran | 135.0 parts, by weight, |
| Cyclohexanone | 150.0 parts, by weight, |

The mixture is processed into a magnetic tape in the same way as described in Example 1.

COMPARISON EXAMPLE C

The magnetic coating dispersion is prepared in the same way as described in Example 2, except that the polyurethane used in accordance with the present invention is replaced by a polyester polyurethane prepared from adipine acid, butane diol, diphenyl diisocyanate according to DE-AS No. 1,106,959.

EXAMPLE 3

A magnetic coating dispersion is prepared from

| | |
|---|---|
| Magnetite | 180. parts, by weight, |
| Dodecyl benzene sulphonic acid | 3 parts, by weight |
| ethoxylated phosphoric acid ester | 3 parts, by weight |
| A hydroxyl groups containing copolymer of vinyl chloride and vinyl acetate | 11 parts, by weight |
| A polyester urethane of a copolyester of ethylene glycol/1,4-butane diol having a molecular weight of 2000, ethylene glycol and 1,4-butane diol (molar ratio 1:1) and 4,4'-diphenyl methane diisocyanate | 22 parts, by weight |
| Technical stearic acid | 0.9 parts, by weight |
| Tetrahydrofuran | 280.0 parts, by weight |
| Cyclohexanone | 100.0 parts, by weight |

Processing of the dispersion and production of the magnetic tape are carried out in the same way as described in Example 1.

COMPARISON EXAMPLE D

The magnetic coating dispersion is prepared in the same way as described in Example 3, except that the polyurethane used in accordance with the present invention is replaced by a polyester polyurethane prepared from adipine acid, butane diol, diphenyl diisocyanate according to DE-AS No. 1,106,959.

EXAMPLE 4

The magnetic coating dispersion to be tested is prepared from

| | |
|---|---|
| Magnetite | 180.0 parts, by weight |
| Lecithin | 7.5 parts, by weight |
| A hydroxyl groups containing copolymer of vinyl chloride and vinyl acetate | 11.0 parts, by weight |
| The same polyurethane as in Example 3 | 22.0 parts, by weight |
| Technical stearic acid | 0.9 part , by weight |
| Tetrahydrofuran | 280.0 parts, by weight |
| Cyclohexanone | 100.0 parts, by weight |

After predispersion in a dissolver, the dispersion is ground in a bead mill. The grinding time is 20 hours for a throughput of the grinding volume in 1 hour. The lacquer is further processed in the same way as in Example 1.

COMPARISON EXAMPLE E

The magnetic coating dispersion is prepared in the same way as described in Example 4, except that the polyurethane used in accordance with the present invention is replaced by a polyurethane prepared from adipine acid, butane diol, diphenyl diisocyanate according to DE-AS No. 1,106,959.

EXAMPLE 5

A magnetic coating dispersion is prepared from

| | |
|---|---|
| Magnetite | 89.0 parts, by weight |
| Lecithin | 4.0 parts, by weight |
| A hydroxyl groups containing copolymer of vinyl chloride and vinyl acetate | 5.4 parts, by weight |
| The same polyurethane as in Example 3 | 1.6 parts, by weight |
| Technical stearic acid | 0.5 part , by weight |
| Tetrahydrofuran | 140.0 parts, by weight |
| Cyclohexanone | 50.0 parts, by weight |

Processing is carried out in the same way as in Example 4.

COMPARISON EXAMPLE F

The coating dispersion is prepared in the same way as described in Example 5, except that the polyurethane according to the present invention is replaced by a polyester polyurethane prepared from adipine acid, butane diol, diphenyl diisocyanate according to DE-AS No. 1,106,959.

A magnetic coating dispersion is prepared from

| | |
|---|---|
| Magnetite | 180.0 parts, by weight |
| Dodecyl benzene sulphonic acid | 3.0 parts, by weight |
| ethoxylated phosphoric acid ester | 3.0 parts, by weight |
| Polyvinyl formal | 13.5 parts, by weight |
| The same polyurethane as in Example 3 | 19.5 parts, by weight |
| Technical stearic acid | 0.9 part , by weight |
| Tetrahydrofuran | 280.0 parts, by weight |
| Cyclohexanone | 100.0 parts, by weight |

The tape is produced in the same way as described in Example 1.

COMPARISON EXAMPLE G

The procedure is as described in Example 6, except that the polyurethane used in accordance with the present invention is replaced by a polyester polyurethane prepared from adipine acid, butane diol, diphenyl diisocyanate according to DE-AS No. 1,106,959.

COMPARISON EXAMPLE H

The coating dispersion to be tested is prepared in the same way as described in Example 6, but using a polyether polyurethane of the type described in U.S. Pat. No. 2,899,411 (sold under the trademark Estane 5714 by Goodrich.

EXAMPLE 7

The magnetic coating dispersion is prepared in the same way as described in Example 4, except that the hydroxyl groups containing copolymer of vinyl chloride and vinyl acetate is replaced by a copolymer of vinyl chloride and hydroxy propyl acrylate.

COMPARISON EXAMPLE K

The procedure is as described in Example 7, except that the polyurethane used in accordance with the present invention is replaced by a polyester polyurethane prepared from adipine acid, butane diol, diphenyl diisocyanate according to DE-AS No. 1,106,959.

EXAMPLE 8

A magnetic coating dispersion is prepared from

| Magnetite having a BET-surface of 32 m²/g | 75.0 parts, by weight |
|---|---|
| Dodecyl benzene sulphonic acid | 2.2 parts, by weight |
| Polyvinyl formal | 2.8 parts, by weight |
| The same polyurethane as in Example 3 | 13.7 parts, by weight |
| Technical stearic acid | 0.5 part, by weight |
| Tetrahydrofuran | 145.0 parts, by weight |
| Cyclohexanone | 25.0 parts, by weight |

Grinding and tape production are carried out in the same way as in Example 4.

COMPARISON EXAMPLE L

A coating dispersion is prepared in the same way as in Example 8, except that the polyurethane used in accordance with the present invention is replaced by a polyether polyurethane according to U.S. Pat. No. 2,899,411 (sold under the trademark Estane 5714 by Goodrich.

The magnetic storage materials are assessed on the basis of the following criteria:

(a) non-calendered tape:

$$\text{pigment packing volume } PPV = \frac{\text{pigment volume}}{\text{layer volume}}$$

(b) calendered tape:
ratio of remanent magnetisation to magnetisation at a field strength of 1000 Oe ($M_R/M_{1000}$)
ratio of the remanent magnetisations in the longitudinal and transverse directions of the tape $$\left(OR = \frac{M_R =}{M_R}\right)$$

after magnetisation at 4000 Oe.

Surface quality as determined by microscope (differential interference contrast method)

abrasion resistence in use: after the test tapes have been made up into compact cassettes, a running test is carried out in a conventional commercial cassette recorder. After 14 runs, the tape and the various tape guides are tested for magnetic material removed by abrasion. The results are set out in Table 1.

| Example | Packing density % | $M_R/M_{1000}$ | OR | Surface | Abrasion resistance |
|---|---|---|---|---|---|
| 1 | 48 | 0.84 | 2.0 | very good | very good |
| Comparison A | 44 | 0.82 | 1.9 | slightly rough | average |
| Comparison B | 46 | 0.83 | 1.9 | rough | good |
| 2 | 42 | 0.81 | 1.9 | very good | good |
| Comparison C | 39 | 0.80 | 1.9 | slightly rough | average |
| 3 | 45 | 0.84 | 2.1 | very good | very good |
| Comparison D | 44 | 0.82 | 2.0 | good | good |
| 4 | 44 | 0.84 | 2.2 | very good | very good |
| Comparison E | 42 | 0.82 | 2.0 | good | good |
| 5 | 35.5 | 0.80 | 2.9 | very good | excellent |
| Comparison F[1] | — | 0.77[2] | — | — | — |
| 6 | 42 | 0.83 | 2.0 | very good | very good |
| Comparison G | 41 | 0.81 | 1.9 | slightly rough | average |
| Comparison H | 39 | 0.82 | 1.9 | rough | average |
| 7 | 41 | 0.82 | 2.0 | very good | very good |
| Comparison K | 41 | 0.81 | 1.9 | good | average |
| 8 | 43 | 0.79 | 2.0 | very good | very good |
| Comparison L | 41 | 0.77 | 1.9 | good | average |

[1] the dispersion was not processed because of its poor quality
[2] determined on hand scrapings

We claim:
1. A magnetic storage medium consisting of a non-magnetic layer support and, applied thereto, at least one magnetisable layer containing finely particulate magnetic pigments and polyurethanes as binder, characterised in that the binder consists of from 25 to 100% of a thermoplastic polyurethane
having a hardness of from 80 to 100 Shore A, a tensile strength of from 30 to 75 MPa and a breaking elongation of from 320 to 520% and
substantially free from reactive terminal groups; obtained by reacting:
(a) a linear polyester of at least one dicarboxylic acid containing from 2 to 8 carbon atoms and/or hydroxy carboxylic acid containing from 4 to 6 carbon atoms and at least one glycol containing from 2 to 12 carbon atoms, the molecular weight of the polyester being from 1200 to 6000, with
(b) at least one diisocyanate, and

(c) a mixture consisting of at least two straight-chain diols containing from 2 to 20 carbon atoms, and free of branchedchain diols, the molar fraction of the individual components not exceeding 0.8.

2. A magnetic storage medium as claimed in claim 1, characterised in that the polyurethane is obtained by reacting a copolyester of ethylene glycol/butane diol and adipic acid having a molecular weight of 2000, 4,4'-diphenyl methane diisocyanate and a mixture consisting of 1,4-butane diol and 1,6-hexane diol in a molar ratio of from 3:2 to 2:3.

3. A magnetic storage medium as claimed in claim 1, characterised in that the polyurethane is obtained by reacting a copolyester of ethylene glycol/butane diol and adipic acid having a molecular weight of 2000, 4,4'-diphenyl methane diisocyanate and a mixture of ethylene glycol and 1,4-butane diol in a molar ratio of from 3:2 to 2:3.

4. A magnetic storage medium as claimed in claim 1, characterised in that the polyurethane is obtained by reacting a polyester of 1,4-butane diol and adipic acid having a molecular weight of 2000, 4,4'-diphenyl methane diisocyanate and a mixture of 1,4-butane diol and 1,6-hexane diol in a molar ratio of 70:30.

5. A magnetic storage medium as claimed in claim 4, characterised in that a polyvinyl acetal is used as additional binder.

6. A magnetic storage medium as claimed in claim 4, characterised in that a polyvinyl formal is used as additional binder.

7. A magnetic storage medium as claimed in claim 4 characterised in that a polyvinyl butyral is used as additional binder.

8. A magnetic storage medium as claimed in claim 4, characterised in that a hydroxyl-containing copolymer of vinyl acetate and vinyl chloride is used as additional binder.

9. A magnetic storage medium as claimed in claim 4, characterised in that a copolymer of vinyl chloride and hydroxy propyl acrylate or methacrylate is used as additional binder.

* * * * *